(No Model.)
J. B. WEST.
VEHICLE WHEEL.
No. 463,181. Patented Nov. 17, 1891.
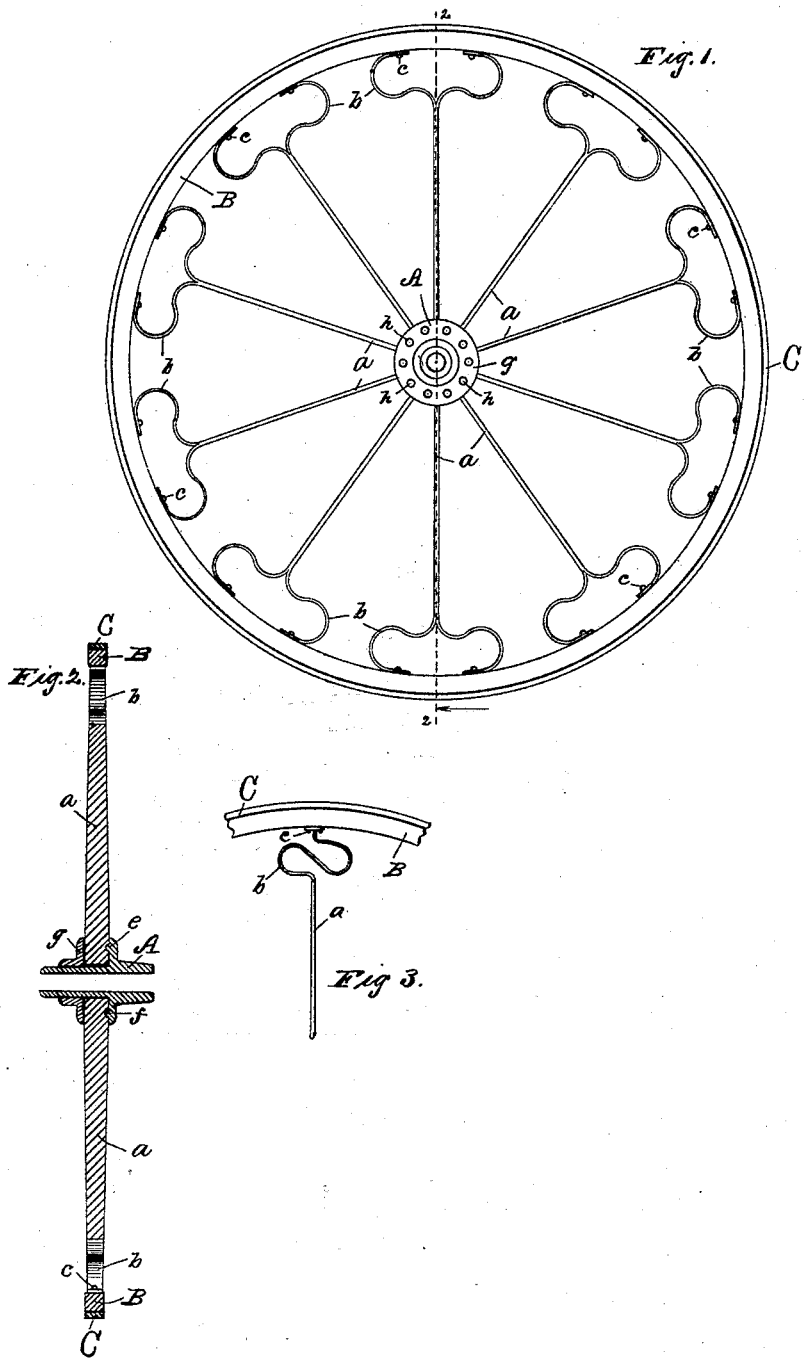
Attest:
M. L. McDermott.
M. D. Phillips.
Inventor:
Jonathan B. West,
By E. B. Whitmore, Atty.

UNITED STATES PATENT OFFICE.

JONATHAN B. WEST, OF ROCHESTER, NEW YORK.

VEHICLE-WHEEL.

SPECIFICATION forming part of Letters Patent No. 463,181, dated November 17, 1891.

Application filed November 7, 1890. Serial No. 370,686. (No model.)

*To all whom it may concern:*

Be it known that I, JONATHAN B. WEST, of Rochester, in the county of Monroe and State of New York, have invented a new and useful Improvement in Vehicle-Wheels, which improvement is fully set forth in the following specification and shown in the accompanying drawings.

My invention relates to wheels for light vehicles, such as light road wagons, velocipedes, &c., the same being hereinafter fully described, and more particularly pointed out in the claim.

Referring to the drawings, Figure 1 is a side elevation of a wheel, showing my invention. Fig. 2 is a diametrical section on the dotted line 2 2 in Fig. 1. Fig. 3 shows a slight modification in the form of the spoke.

Referring to the parts, A is the hub of the wheel, B the felly, and C the tire, which parts are substantially of common construction. $a$ are the spokes, which are preferably made of metal, as shown, though they may be made of wood or other material. The outer ends of the spokes are connected with the felly by springs $b$, so as to form an elastic connection between the felly and the hub to support the weight of the vehicle. These springs take the jar, resulting from running over rough pavement, off the axle, rendering the latter less liable to become crystallized and broken, besides causing the body of the vehicle to rest more easily in the wheels and adding greatly to the comfort of the rider. The outer ends of the spokes may be simply bent into S-shaped or reversed curves, or they may be split and each part bent into a reverse curve or into the form of an S, as shown. In either case, however, the curved portion of the spoke is a part of the spoke inseparable therefrom.

As shown in Fig. 6, the wheel is formed with a light inner or sub felly $d$ within the main felly B, to which inner felly the spokes are rigidly secured. In this construction the springs $b$ are placed between the sub-felly and the main or outer felly.

I form the inner ends of the spokes with notches $e$, Fig. 2, within the hub, the latter being formed with projections $f$ to enter said notches. The outer circular plate $g$ of the hub is secured to the latter by bolts $h$ in the ordinary manner, and when drawn up against the spokes the latter are prevented from working out of the hub on account of the notches and projections above mentioned.

What I claim as my invention is—

A vehicle-wheel having a rigid felly, in combination with a two-part hub, one part movable upon the other, and rigid spokes held between the two said parts of the hub, said spokes being rigid and radial with hub and joined to the felly by S-shaped or reversely-curved springs, each in one piece and rigid with the spokes, substantially as shown and described.

In witness whereof I have hereunto set my hand, this 5th day of November, 1890, in the presence of two subscribing witnesses.

JONATHAN B. WEST.

Witnesses:
POMEROY P. DICKINSON,
B. DAWE.